June 22, 1937.  E. E. HEWITT  2,084,683

PISTON RING TESTING DEVICE

Filed Jan. 11, 1934

INVENTOR.
ELLIS E. HEWITT
BY Wm. M. Cady
ATTORNEY.

Patented June 22, 1937

2,084,683

UNITED STATES PATENT OFFICE 2,084,683

PISTON RING TESTING DEVICE

Ellis E. Hewitt, Edgewood, Pa., assignor to The Westinghouse Air Brake Company, Wilmerding, Pa., a corporation of Pennsylvania Application January 11, 1934, Serial No. 706,226

12 Claims. (Cl. 73—51)

This invention relates to testing devices, and more particularly to means for testing piston packing ring leakage.

The principal object of the invention is to provide means for use in connection with a piston provided with a plurality of packing rings and mounted to reciprocate in a cylinder, whereby the leakage condition of each individual ring on the piston can be ascertained.

Figure 1:
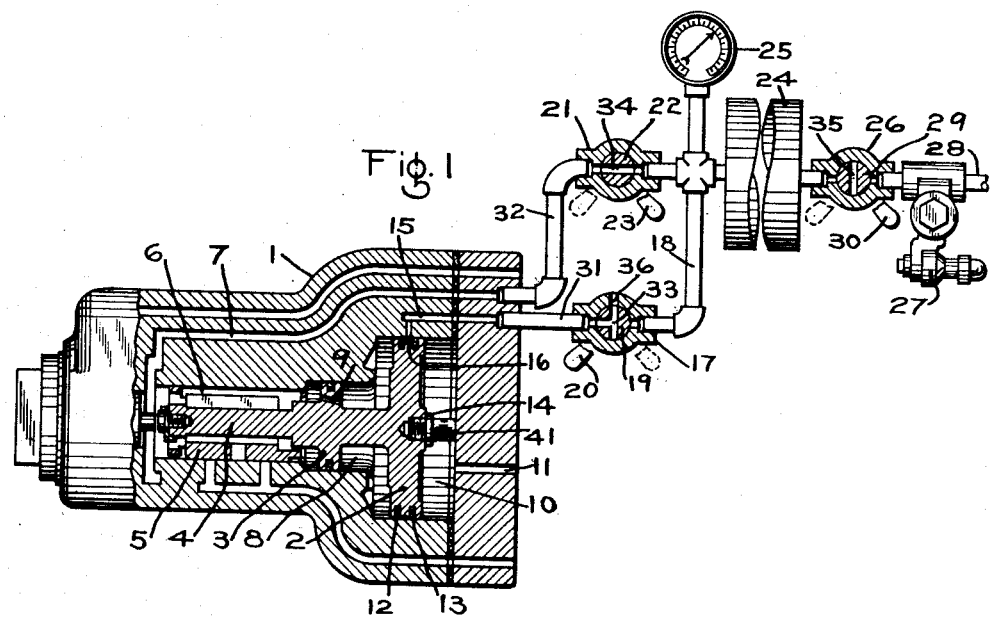
Figure 2:
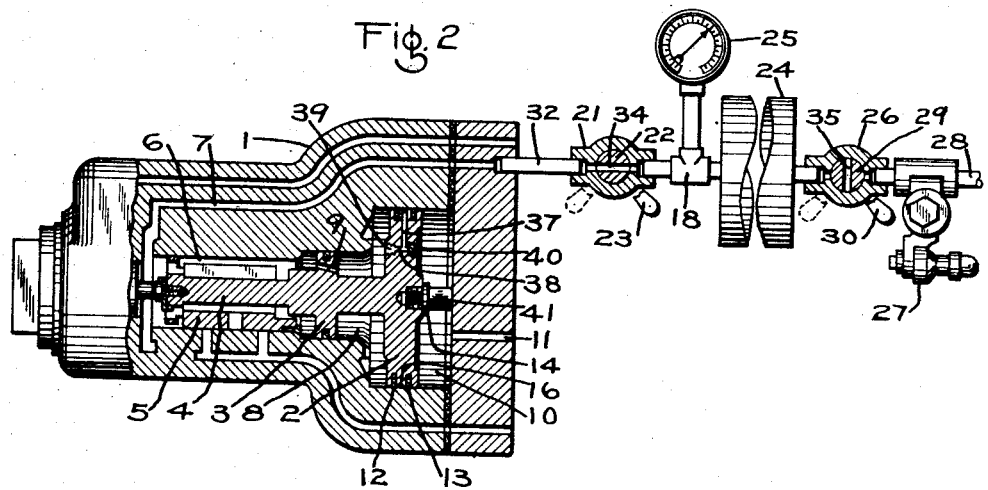

In the accompanying drawing; Fig. 1 is a diagrammatic sectional view of a fluid pressure controlled device and having means embodying the invention for ascertaining packing ring leakage; and Fig. 2 is a view similar to that shown in Fig. 1, but showing a modified form of the invention.

The invention is preferably associated with a fluid pressure controlled device, which, for the purpose of illustration, comprises a casing 1 containing pistons 2 and 3 operatively connected together and mounted to reciprocate in concentric bores in said casing. Said pistons are provided with a stem 4 adapted to operate a slide valve 5 contained in chamber 6 which is connected to a passage 7 which leads to the exterior of the casing.

A chamber 8 is formed between the pistons 2 and 3 and is in permanent communication with valve chamber 6 through a small port 9 provided in the piston 3. A control chamber 10 is formed at the outer face of the piston 2 and is open to a passage 11 leading to the exterior of the casing and through this passage, fluid under pressure is adapted to be supplied to and vented from control chamber 10 for effecting movement of the piston 2 back and forth in its bore, in the operation of the device, which, however, forms no part of the invention.

The piston 2 is provided with two packing rings 12 and 13 for preventing leakage between chambers 8 and 10 when the pressure in one of said chambers is lower or higher than that in the other.

In the operation of a device of this character, there is usually some area of the piston bore intermediate the extremes of the stroke of the piston, where greater wear occurs than in any other portion of the bore, and it will be evident that when the piston is in this zone of maximum wear, greater leakage past the piston rings will occur than in any other position of the piston.

According to the invention it is proposed to measure the leakage of rings 12 and 13 in the position of piston 2 where maximum wear occurs, and therefore, where the worst leakage condition is liable to exist. In order to locate the piston 2 in this position, a stop 41 is screwed into a bore in the outer face of piston 2, this stop being provided with an annular collar 14 adapted to bottom against the piston, so that the stop will project from the piston face a predetermined distance and thereby locate the piston 2 in a predetermined position in which the stop is in engagement with the casing 1, as shown in Fig. 1 of the drawing.

The casing 1 is provided with a passage 15 which, when the piston 2 is positioned by the stop 41, leads to the cylindrical clearance space between the periphery of the piston 2 and its bore, and the rings 12 and 13, this passage being provided only for use in connection with checking the leakage condition of the piston rings 12 and 13, and at all other times this passage is adapted to be plugged. To ensure that there will be free flow of fluid under pressure through this clearance space around the piston 2, a groove 16 is provided in the periphery of the piston between the rings 12 and 13.

A cock 17 is provided for controlling the supply and release of fluid under pressure to and from the passage 15, a pipe 31 connecting passage 15 with said cock and a pipe 18 connecting said cock to a test reservoir 24. The cock 17 comprises a casing containing a rotary plug valve 19 adapted to be turned to various positions by means of a handle 20.

A cock 21 is provided for controlling the supply and release of fluid under pressure to and from passage 7 leading to the valve chamber 6, a pipe 32 connecting passage 7 with said cock which is also connected to pipe 18. The cock 21 comprises a casing containing a rotary plug valve 22 adapted to be turned to various controlling positions by means of a handle 23.

A cock 26 is provided to control the supply of fluid under pressure to the reservoir 24 from a reducing valve device 27 which is supplied through a pipe 28 with fluid under pressure from any convenient or suitable source. The cock 26 comprises a casing containing a rotary plug valve 29 adapted to be turned to various positions by means of a handle 30. The reducing valve device 27 is provided merely to automatically limit the pressure of fluid supplied to reservoir 24, and may be of any suitable construction which will operate to reduce the pressure of the source, as supplied through pipe 28, to a pressure suitable for testing purposes. A pressure gage 25 is connected to pipe 18 and thereby to the test reservoir 24 for indicating pressure therein.

If it is desired to test the packing rings 12 and 13 for leakage, the stop 41 is applied to the piston 2 and the pipes 31 and 32 are connected to passages 15 and 7, respectively, of the fluid pressure controlled device. If it is desired to ascertain the leakage condition of packing ring 12, for example, the plug valve 19 is positioned as shown in Fig. 1, in which position a port 33 connects pipe 31 and thereby passage 15 to an atmospheric passage 36. The plug valve 22 is positioned, as shown in the drawing, so that a port 34 establishes communication from pipe 18 to pipe 32. The plug valve 29 is then turned from the closed position, as shown in the drawing, to open position in which a port 35 establishes communication from the reducing valve device 27 to reservoir 24. Through this communcation fluid at the pressure supplied by the reducing valve device 27 flows to reservoir 24 and from thence through pipe 18, port 34 in the plug valve 22, pipe 32 and passage 7 to valve chamber 6 and from thence through the port 9 to chamber 8 intermediate the pistons 2 and 3. Since chamber 10 at the outer face of the piston 2 is open to the atmosphere through passage 11, the pressure of fluid applied to said piston in chamber 8 moves said piston toward the right hand until the stop 41 engages the right hand end wall of the chamber 10. With the piston 2 thus positioned by the stop 41, the space around the periphery of the piston 2 and between the packing rings 12 and 13 is open to the atmosphere through the groove 16, passage 15, pipe 31, port 33 in the plug valve 19 and through the atmospheric passage 36.

It will now be seen that the packing ring 12 is subject, on the left hand side to the pressure of fluid in chamber 8 and thereby in the reservoir 24, while on the right hand side is subject to atmospheric pressure.

When the pressure in reservoir 24 acting on the left hand side of the piston 2 is built up to that supplied by the reducing valve device 27, as indicated by the pressure gage 25, the plug valve 29 is turned to the cut out position, as shown in the drawing, thereby cutting off the supply of fluid under pressure to said reservoir.

With the supply of fluid under pressure to the reservoir 24 cut off, if there is leakage of fluid under pressure from piston chamber 8, and thereby from the reservoir 24, past the packing ring 12 to the vented space at the right hand side of said packing ring, such leakage will cause a reduction in the pressure in reservoir 24, as will be indicated by the pressure gage 25, and the degree or rate of reduction thus effected is a measure of the leakage of the packing ring. This measure of leakage may of course be merely relative to that of a ring the condition of which is the best that it is practicable to obtain in manufacturing processes, or in case of accurately calibrated volumes and pressures it may be calculated or even read directly, from a properly calibrated gage 25, in actual loss of fluid.

In order to test the leakage condition of the packing ring 13, the apparatus is operated in the same manner as above described, except that in this case, the plug valve 19 is turned counterclockwise until the port 33 establishes communication between pipes 18 and 31, thereby permitting fluid under pressure to flow from the reservoir 24 to the space and annular groove 16 between the packing rings 12 and 13. The pressures acting on the opposite sides of the packing ring 12 are now equal, and the ring 13 is subject to the pressure of reservoir 24 on the left hand side and to atmospheric pressure in chamber 10 on the opposite side. When the reservoir 24 is now charged with fluid to the pressure supplied by the reducing valve device 27, the plug valve 29 is turned to the cut out position. With the supply of fluid to reservoir 24 thus cut off, if there is leakage from the annular groove past the packing ring 13, such leakage will effect a reduction in pressure in the reservoir 24 which will be indicated by the gage 25, and the degree or rate of such reduction will indicate the leakage condition of the packing ring 13 in the same manner as the leakage condition of the packing ring 12 was ascertained.

The embodiment of the invention shown in Fig. 2 differs from that shown in Fig. 1 in that instead of providing the passage 15 in the casing, which connects with the annular groove 16 in the periphery of the piston 2 between the packing rings 12 and 13, a radially disposed passage 37 is provided in said piston, which is connected to the groove 16 and which leads to a passage 38 extending transversely through the piston and opening at the opposite faces of the piston into screw-threaded sockets 39. In this form of the invention, a plug 40 is normally secured in each of the sockets 39 so as to close communication from the space between the packing rings 12 and 13 to the chamber at the opposite faces of the piston 2 so long as said piston is in normal operation.

With the construction shown in Fig. 2, it is only necessary to employ the reservoir 24, the cock 21 and the gage 25, as shown in Fig. 2, for testing the leakage conditions of the rings 12 and 13.

When it is desired to test the rings 12 and 13 for leakage, if the ring 13, for example, is to be tested, the plug 40 in the left hand face of the piston 2 is removed. The reservoir 24, valve chamber 6 and piston chamber 8 are then charged with fluid under pressure from the reducing valve device 27, and the piston 2 is moved by the pressure of fluid obtained in piston chamber 8 to the position in which the stop 41 engages the casing, this position being that preferred to test the packing rings 12 and 13 for leakage, as in the construction shown in Fig. 1. It will be noted that with the plug 40 removed from the left hand face of the piston 2, fluid at the pressure in the reservoir 24 and piston chamber 8 equalizes through the socket 39, passages 38 and 37 and annular groove 16 on the opposite side of the packing ring 12, and that the packing ring 13 is subject to the pressure in reservoir 24 on the left hand side and to atmospheric pressure in chamber 10 on the right hand side.

With the reservoir 24 charged to the pressure supplied by the reducing valve device 27, the plug valve 29 is turned to the closed position, and then, in case there is leakage of fluid under pressure from the reservoir 24 and chambers 6 and 8 past the packing ring 13 to the chamber 10 which is open to the atmosphere, the resultant reduction in pressure in reservoir 24, as registered by the gage 25, indicates the leakage condition of said ring.

When it is desired to test the packing ring 12 for leakage, the plug 40 at the right is removed leaving the other plug in place. This provides a direct connection from the right hand side of the packing ring 12 to the atmosphere by way of the annular groove 16, passages 37 and 38 and from thence through the chamber 10 and passage 11, so that when the system is charged with fluid under pressure, the packing ring 12 will be subject to the opposing pressures of the reservoir 24 on the left hand side and that of the atmosphere on the right hand side. The leakage test for this packing ring is then conducted in the same manner as for the right hand packing ring.

It will now be evident that, according to the invention, means are provided whereby each ring, of a plurality carried by a piston and mounted to reciprocate in a cylinder, may be individually subjected on opposite sides to a differential of fluid pressures for ascertaining the leakage condition of the ring.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A testing apparatus for ascertaining the leakage condition of each of a plurality of packing rings carried by a piston comprising means for subjecting the outer side of one of said rings to a low fluid pressure, means for applying a higher fluid pressure to the outer side of another of said rings, means adapted to establish a communication through which said low fluid pressure is applied to the inner sides of the two last mentioned rings for providing a differential of pressures upon the opposite sides of one of said rings, means adapted to establish a communication through which said higher pressure is applied to the inner sides of said two rings for establishing a differential of pressures upon the opposite sides of the other of said two rings, and means for ascertaining leakage of fluid past the ring subject to the differential of fluid pressures.

2. A testing apparatus for ascertaining the leakage condition of each of a plurality of packing rings carried by a piston comprising means for subjecting the outer side of one of said rings to a low fluid pressure, means for applying a higher fluid pressure to the outer side of another of said rings, means for at one time subjecting the inner sides of the two last mentioned rings to said low fluid pressure and at another time to said higher fluid pressure for establishing a differential of fluid pressures on the opposite sides of first one of said two rings and then the other, and means for ascertaining leakage of fluid past the ring subject to the differential of fluid pressures.

3. A testing apparatus for ascertaining the leakage condition of each of a pair of packing rings carried by a piston comprising means for subjecting one face of said piston to a low pressure and the opposite face of said piston to a higher pressure, means for connecting the space between said rings to either said low pressure or to said higher pressure to establish a differential of pressures on the opposite sides of one or the other of said rings, and means for indicating leakage past the ring subject to the differential of pressures.

4. A testing apparatus for ascertaining the leakage condition of each of a pair of packing rings carried by a piston comprising means for subjecting one face of said piston to a low pressure and the opposite face of said piston to a higher pressure, means for defining a chosen position of said piston in said bore, a passageway leading to the space at the inner sides of said rings, when said piston is in said chosen position, means controlling communication through said passageway and adapted in one position to permit equalization of said low pressure into said space and in another position to permit equalization of said higher pressure into said space thereby establishing a differential of fluid pressures first on one ring and then the other, and means for measuring the leakage of fluid past the ring subject to the differential of fluid pressures.

5. A testing apparatus for ascertaining the leakage condition of each of a pair of packing rings carried by a piston comprising means for subjecting one face of said piston to a low pressure and the opposite face of said piston to a higher pressure, a passageway in said piston leading to the space between and at the inner sides of said rings, means for at one time opening communication from said passageway to one face of said piston and at another time opening communication from said passageway to the other face of said piston, thereby establishing at different times a differential of fluid pressures on one ring or the other, and means for indicating leakage from the high pressure side to the low pressure side of the ring subjected to said differential of fluid pressures.

6. A testing apparatus for ascertaining the leakage condition of each of a pair of packing rings carried by a piston comprising means for subjecting one face of said piston to a low pressure and the opposite face of said piston to a higher pressure, an annular groove formed in the periphery of said piston between said rings to permit free flow of fluid around the piston, means for at one time establishing a communication from said groove to said low pressure thereby subjecting the inner sides of said rings to said low pressure, and for at another time supplying fluid at said higher pressure to said groove, and means for indicating the leakage of fluid past the ring subject to the low pressure on one side and the higher pressure on the opposite side.

7. A testing apparatus for ascertaining the leakage condition of each of a pair of piston rings carried by a piston having a cylinder space intermediate said rings, and having at both sides a chamber, said apparatus comprising means for charging one of said chambers with fluid under pressure, means for venting the other chamber to the atmosphere, means for either connecting said cylinder space with the atmosphere or charging said cylinder space with fluid under pressure, and a gage for indicating the fall of pressure in the charged chamber, by leakage past one of said rings, when said cylinder space is vented, and for indicating the fall in pressure in said cylinder space, by leakage past the other of said rings, when said cylinder space is charged with fluid under pressure.

8. A testing apparatus for ascertaining the leakage condition of a pair of piston packing rings mounted in a piston comprising means for at one time subjecting one side of one ring to fluid under pressure supplied to a chamber and the opposite side to atmospheric pressure and at another time subjecting opposite sides of said ring and one side of the other ring to the fluid pressure in said chamber with the opposite side of the other ring open to the atmosphere, and means for indicating the fall in fluid pressure in said chamber and thereby leakage by flow of fluid past either piston ring.

9. A testing apparatus for ascertaining the leakage past each individual ring of a plurality when all are in place on a piston, said apparatus comprising means for subjecting the opposite sides of a selected ring of said plurality to a differential of fluid pressures, and means for indicating leakage past the selected ring from the side subject to the higher pressure to the side subject to the lower pressure.

10. A testing apparatus for ascertaining the leakage past each individual ring of a plurality when all are in place on a piston, said apparatus comprising means for subjecting one side of a selected ring of said plurality to a certain fluid pressure, means for subjecting the opposite side of the selected ring to a different fluid pressure, and means for indicating leakage past the selected ring from the side subject to the higher pressure to the side subject to the lower pressure.

11. A testing apparatus for ascertaining the leakage condition of each of a plurality of piston packing rings when all of said rings are in place on the piston comprising means for conditioning a selected ring of said plurality whereby only said selected ring is subjected to a differential of fluid pressures upon the supply of fluid under pressure to one side of said piston, and means for indicating leakage past the selected ring from the side subject to the higher pressure to the side subject to the lower pressure.

12. A testing apparatus for ascertaining the leakage condition of each of a plurality of piston packing rings when all of said rings are in place on the piston comprising adjustable means operative to provide on each of said rings, one at a time, a differential of fluid pressures upon the supply of fluid under pressure to one side of said piston, and means for indicating leakage past the ring subject to the differential of fluid pressures from the side subject to the higher pressure to the side subject to the lower pressure.

ELLIS E. HEWITT.